US009185334B2

(12) United States Patent
Mihara

(10) Patent No.: US 9,185,334 B2
(45) Date of Patent: Nov. 10, 2015

(54) METHODS AND DEVICES FOR VIDEO GENERATION AND NETWORKED PLAY BACK

(75) Inventor: Hidekazu Mihara, Kunitachi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 329 days.

(21) Appl. No.: 12/972,256

(22) Filed: Dec. 17, 2010

(65) Prior Publication Data

US 2011/0235992 A1 Sep. 29, 2011

(30) Foreign Application Priority Data

Mar. 26, 2010 (JP) .................................. 2010-073705

(51) Int. Cl.
*H04N 5/775* (2006.01)
*H04N 21/4223* (2011.01)
*H04N 21/436* (2011.01)
*H04N 21/81* (2011.01)
*G11B 27/031* (2006.01)
*H04N 5/765* (2006.01)

(52) U.S. Cl.
CPC ......... *H04N 5/775* (2013.01); *H04N 21/43615* (2013.01); *H04N 21/8153* (2013.01); *G11B 27/031* (2013.01); *H04N 5/765* (2013.01); *H04N 21/4223* (2013.01)

(58) Field of Classification Search
CPC ..................... H04N 21/4223; H04N 21/43615; H04N 21/8153; H04N 5/765; H04N 5/775
USPC ............................. 386/239–241; 348/143–161
See application file for complete search history.

(56) References Cited

U.S. PATENT DOCUMENTS

| 6,144,797 | A * | 11/2000 | MacCormack et al. ....... 386/224 |
| 7,774,425 | B2 | 8/2010 | Jin et al. |
| 2005/0177859 | A1 * | 8/2005 | Valentino et al. ............. 725/105 |
| 2006/0114327 | A1 * | 6/2006 | Araya et al. ............. 348/207.99 |
| 2006/0171453 | A1 * | 8/2006 | Rohlfing et al. .......... 375/240.01 |
| 2008/0106597 | A1 * | 5/2008 | Amini et al. .................. 348/143 |
| 2008/0244373 | A1 * | 10/2008 | Morris et al. ................. 715/202 |
| 2009/0252176 | A1 * | 10/2009 | Morita et al. ................. 370/401 |
| 2012/0098970 | A1 * | 4/2012 | Amini et al. .................. 348/159 |

FOREIGN PATENT DOCUMENTS

| JP | 2001-211443 A | 8/2001 |
| JP | 2006-339855 | 12/2006 |
| JP | 2008-021293 | 1/2008 |

(Continued)

OTHER PUBLICATIONS

Office Action received in Japanese Patent Application No. 2011-194783, dated Jan. 25, 2013.

*Primary Examiner* — Gelek W Topgyal
(74) *Attorney, Agent, or Firm* — Knobbe, Martens, Olson & Bear LLP

(57) ABSTRACT

In one embodiment, there is provided an image processing device. The image processing device includes: an acquisition module configured to acquire one or more images stored in one or more servers through a network; a generator configured to generate video data based on the images; a first transmitter configured to transmit an instruction through the network to a display device to play back the video data; and a second transmitter configured to transmit the video data to the display device through the network in response to a request from the display device.

18 Claims, 16 Drawing Sheets

(56) References Cited

FOREIGN PATENT DOCUMENTS

| JP | 2008-204397 A | 9/2008 |
| JP | 2008-258678 A | 10/2008 |
| JP | 2008-262643 A | 10/2008 |
| JP | 2009-290557 | 12/2009 |

* cited by examiner

METHODS AND DEVICES FOR VIDEO GENERATION AND NETWORKED PLAY BACK

CROSS-REFERENCE TO RELATED APPLICATION

This application claims priority from Japanese Patent Application No. 2010-073705, filed on Mar. 26, 2010, the entire contents of which are hereby incorporated by reference.

BACKGROUND

1. Field

Embodiments described herein generally relate to an image processing device and an image processing method.

2. Description of the Related Art

There is provided a technique for sharing contents such as video and images among home electronic devices, such as a computer, a digital television set and a hard disk recorder, which are connected to each other through a local area network. For example, UPnP (Universal Plug and Play) can be used as specifications for connecting these electronic devices to one another and operating these electronic devices. In UPnP AV Architecture of UPnP, specifications have been defined in such manner that a control point acquires information of contents stored in a media server from the media server, selects contents to be played back from the contents, and instructs a media renderer to acquire/play back the selected contents.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided an image processing device. The device includes: an acquisition module configured to acquire one or more images stored in one or more servers through a network; a generator configured to generate video data based on the images; a first transmitter configured to transmit an instruction through the network to a display device to play back the video data; and a second transmitter configured to transmit the video data to the display device through the network in response to a request from the display device.

An embodiment of the invention will be described below with reference to the drawings.

Figure 1:
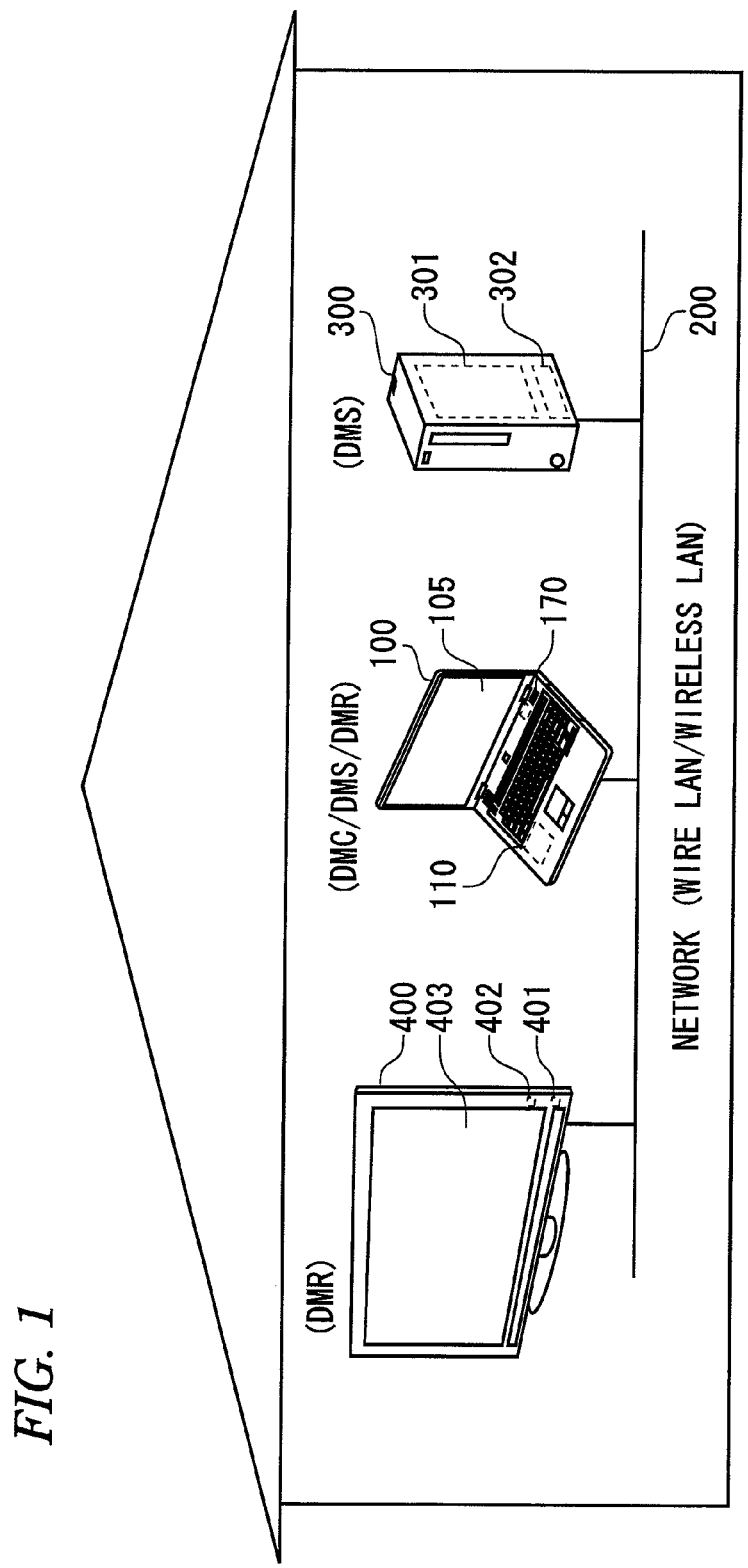
FIG. 1 is a diagram showing a network system according to an embodiment of the invention.

FIG. 1 is a diagram showing an example of a configuration of a network system including an image processing device according to the embodiment. Here, the image processing device according to the embodiment is implemented, for example, as a notebook type computer 100. The computer 100 is connected to a network 200 composed of a wire or wireless LAN, etc. A storage device 300, a display device 400, etc. are connected to the network 200.

The computer 100 includes an LCD 105, an HDD 110, a media control program 150 (not shown in FIG. 1), a communication module 170, a video generation engine 180 (not shown in FIG. 1). Here, the LCD 105 is a display for displaying images. In addition, the HDD 110 is a storage medium for storing data such as images. The media control program 150 is a program serving as a DMC which will be described later. The media control program 150 can control the storage device 300 and the display device 400. The communication module 170 communicates with the storage device 300, the display device 400, a communication device 500 through the network 200. The video generation engine 180 has a function of generating video based on images inputted to the video generation engine.

In addition, the storage device 300 includes a storage module 301, a communication module 302, etc. The storage device 300 has a function of transmitting image data stored in the storage module 301 to the computer 100 or the display device 400 through the communication module 302 under the control of the computer 100. Incidentally, URI's are assigned to image data stored in the storage module 301, respectively. Thus, when a URI-designated data request is issued from the computer 100 or the display device 400, the storage device 300 transmits image data corresponding to the URI in response to the data request.

The display device 400 includes a communication module 401, a decoder 402, an LCD 403. The display device 400 receives image data/video data from the computer 100 or the storage device 300 through the communication module 401 under the control of the computer 100. The decoder 402 decodes (plays back) the received image data/video data so that the decoded image data/video data can be displayed on the LCD 403.

Here, each of the computer 100, the storage device 300 and the display device 400 has a UPnP (Universal Plug And Play) function for recognizing presence of any other device on the network 200 and mutually controlling functions of the other devices. Each of the computer 100, the storage device 300 and the display device 400 can further use the UPnP function to thereby serve as a home network device defined in DLNA (Digital Living Network Alliance) guidelines. The home network devices are classified into categories such as a digital media server (DMS), a digital media controller (DMC), a digital media renderer (DMR), etc.

The DMC is a device for controlling devices such as the DMS and the DMR. The DMS is a device for providing contents data stored in a storage module of the DMS to the DMR in accordance with a request given from the DMC. Incidentally, the DMS may use UPnP CDS (Content Directory Service) with respect to URI's of image data stored in the DMS, so that the image information can be opened to the network so as to be acquired by the DMC.

The DMC can acquire the image information opened based on the CDS by the DMS, for example, due to a Browse action, and acquire a URI of each image data. In addition, the DMC sets the URI of data as a playback target in the media renderer due to a SetAVTransportURI action of UPnP AVT (Audio/Visual Transport service).

When the URI of data as a playback target is set by the DMC, the DMR acquires the data from the URI. Successively, when the DMR receives a Play action of AVT from the DMC, the DMR plays back the acquired data.

In the embodiment, the computer 100 can serves as any device of the DMC, the DMS and the DMR. The storage device 300 serves as the DMS. The display device 400 serves as the DMR.

Incidentally, in a related-art network system, for playback of image data stored in the DMS on the DMR, the DMC instructs the DMR to acquire and play back images from the DMS, and the DMR acquires and plays back the image data in accordance with the instruction.

On the other hand, in the network system according to the embodiment, when image data of the DMS are displayed on the DMR in accordance with an instruction from the DMC, that is, when image data stored in the storage device 300 are played back on the display device 400 in accordance with an instruction from the computer 100, the video generation engine 180 of the computer 100 can generate video data based on the image data of the storage device 300 and display the image data on the display device 400 so that video favorite with a user can be provided. Details about this will be described with reference to FIGS. 2 to 16.

Although FIG. 1 shows the case where the computer 100 and the storage device 300 are indicated as DMS's, other DMS's may be connected to the network 200. In addition, other DMR's than the computer 100 and the display device 400 may be connected to the network 200.

Figure 2:
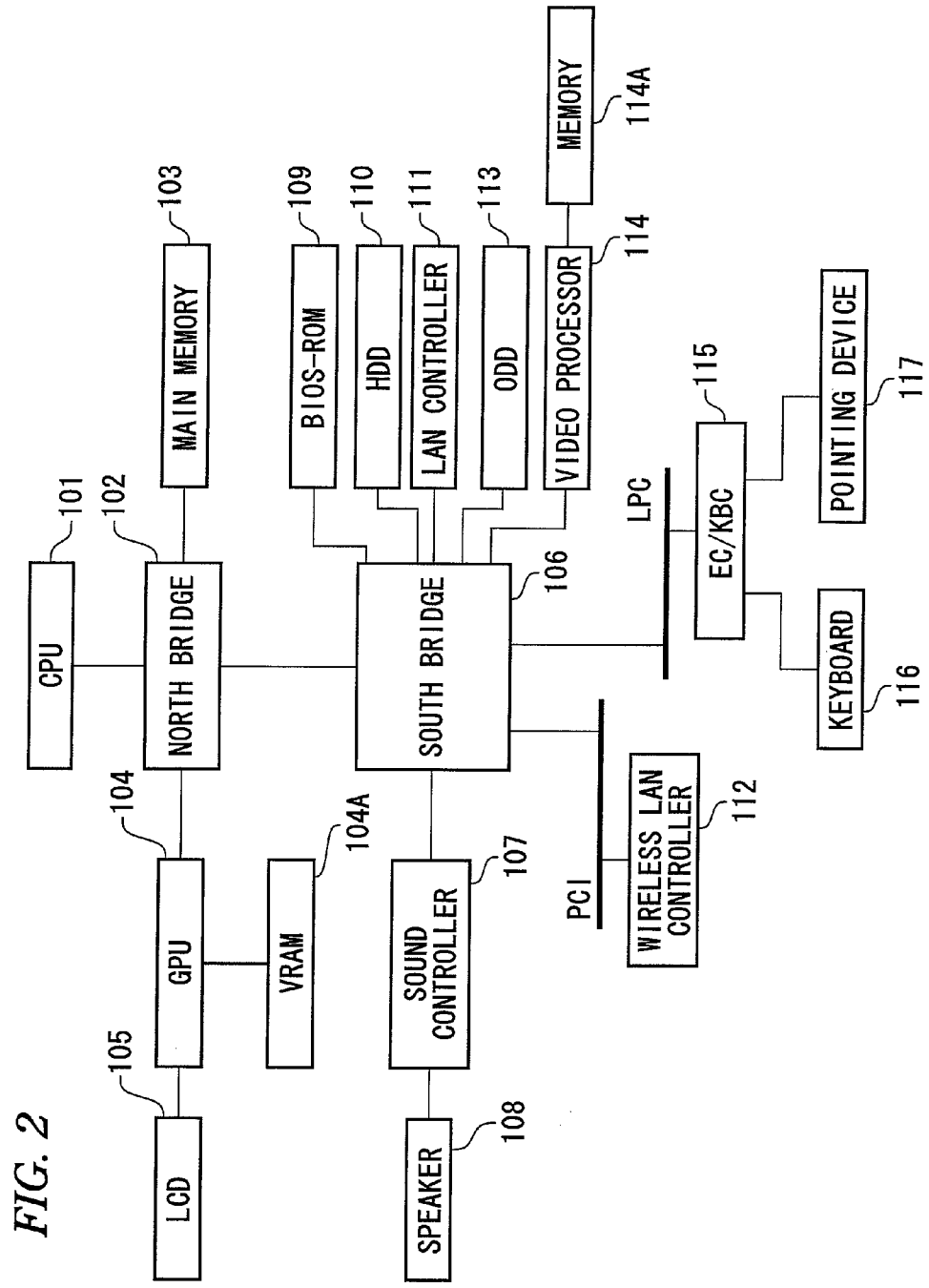
FIG. 2 is a diagram showing a system configuration of a computer according to the embodiment of the invention.

A system configuration of the computer 100 according to the embodiment will be described next with reference to FIG. 2.

The computer 100 includes a CPU 101, a north bridge 102, a main memory 103, a GPU 104, a VRAM 104A, an LCD 105, a south bridge 106, a sound controller 107, a speaker 108, a BIOS-ROM 109, an HDD 110, an LAN controller 111, an ODD 113, a video processor 114, a memory 114A, a wireless LAN controller 112, an EC/KBC 115, a keyboard 116, a pointing device 117, etc.

The CPU 101 is a processor for controlling operation of the computer 100. The CPU 101 executes various application programs such as an operating system (OS) 160 and the media control program 150 loaded onto the main memory 103 from the HDD 110. The CPU 101 also executes a BIOS (Basic Input/Output System) stored in the BIOS-ROM 109. The BIOS is a program for controlling hardware of the computer 100.

The north bridge 102 is a bridge device for connecting a local bus of the CPU 101 and the south bridge 106 to each other. The north bridge 102 has a built-in memory controller for controlling access to the main memory 103. The north bridge 102 also has a function of executing communication with the GPU 104.

The GPU 104 is a display controller for controlling the LCD 105 used as a display of the computer 100. The GPU 104 executes display processing for rendering display data on the VRAM 104A based on a rendering request inputted from the CPU 101 through the north bridge 102.

The south bridge 106 controls respective devices which are connected onto a PCI (Peripheral Component Interconnect) bus and an LPC (Low Ping Count) bus. The south bridge 106 further has a built-in IDE (Integrated Drive Electronics) controller for controlling the HDD 110 and the ODD 113, and a built-in memory controller for controlling access to the BIOS-ROM 109. The south bridge 106 also has a function of executing communication with the sound controller 107 and the LAN controller 111.

The sound controller 107 is a sound source device which outputs audio data as a playback target to the speaker 108. The HDD 110 is a storage medium for storing programs such as the OS and the media control program 150, image data, etc. The LAN controller 111 is a wire communication device for executing wire communication, for example, based on the IEEE 802.3 standard. The wireless LAN controller 112 is a wireless communication device for executing wireless communication, for example, based on the IEEE 802.11 standard. The ODD 113 is a device for controlling writing/reading of data into/from a portable optical disk.

The video processor 114 executes image processing such as an indexing process for indexing image data acquired from the storage device 300 or the HDD 110 and a video generation process for generating video data based on the acquired image data. The memory 114A is used as a work memory for the video processor 114. For example, the video processor 114 can execute a face detection process for detecting a face image and its position and size from image data, and a process for generating video having a focus effect on a face of a person based on information about the face image and its position and size included in the image data, which information is obtained from the face detection process.

Although a large amount of operation is required for executing image processing on image data, the video processor 114 serves as a back end processor for the CPU 101 to perform image processing so that the image processing can be executed while the load imposed on the CPU 101 is suppressed.

The EC/KBC 115 is a controller including an embedded controller for performing power management of the CPU 101, and a keyboard controller for controlling the keyboard 116 and the pointing device 117. The EC/KBC 115 has a function of powering on/off the computer 100 in accordance with a user's operation.

Figure 3:
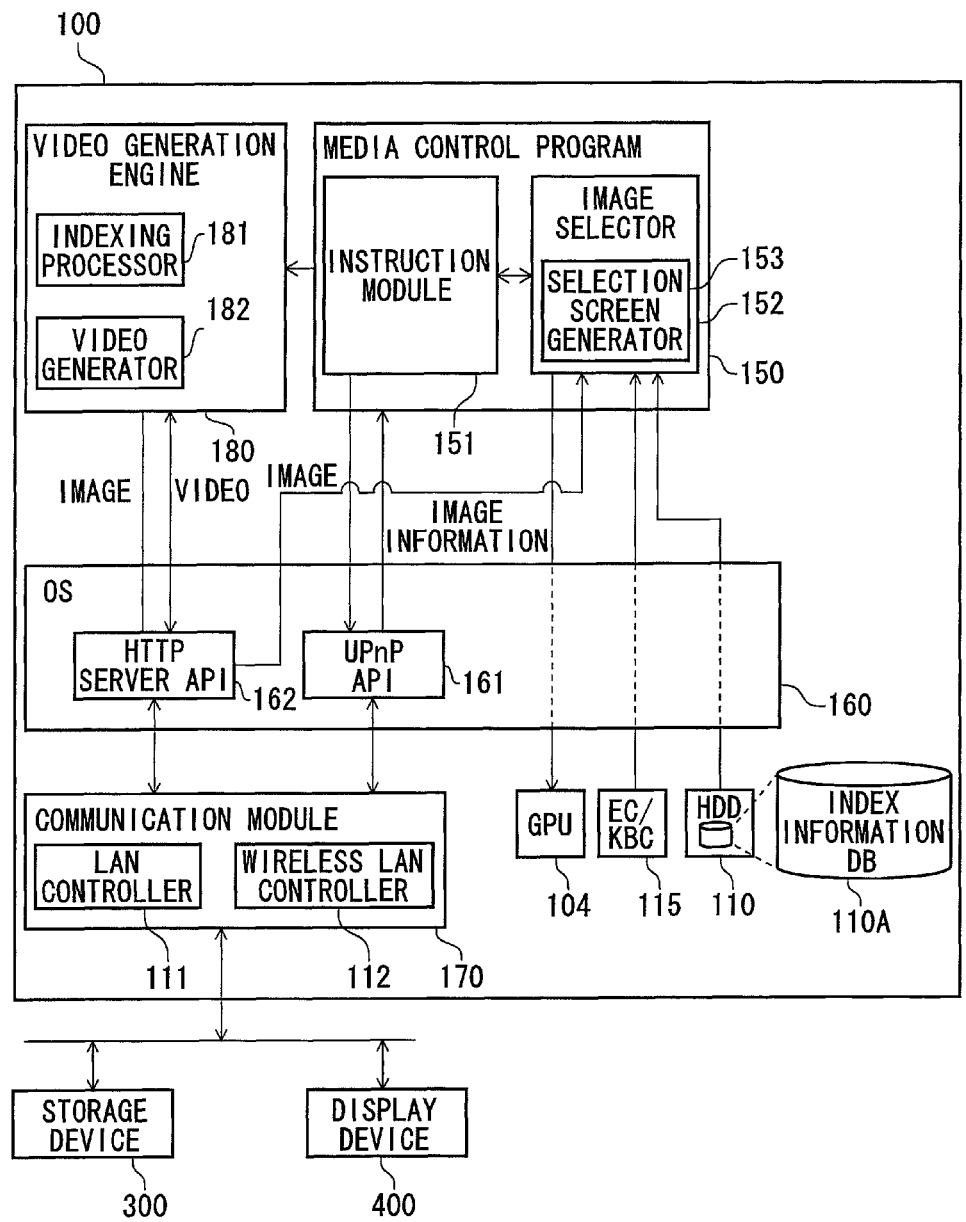
FIG. 3 is a diagram showing functional blocks of the computer according to the embodiment of the invention.

An example of functional blocks of the computer 100 according to the embodiment will be described below with reference to FIG. 3. FIG. 3 is a diagram showing functional blocks of the computer 100 by way of example.

The computer 100 has functional blocks such as a media control program 150, an OS 160, a communication module 170, a video generation engine 180, etc.

The media control program 150 includes an instruction module 151, and an image selector 152. The media control program 150 has a function of sending an instruction to the storage device 300 and the display device 400 through the OS 160 and the communication module 170. The OS 160 has a function of controlling hardware of the computer 100. The OS 160 further has a UPnP API 161, and an HTTP server API 162.

The communication module 170 includes an LAN controller 111, and a wireless LAN controller 114. The communication module 170 communicates with the storage device 300 and the display device 400 through the network 200. The video generation engine 180 has a function of performing an indexing process for indexing image data inputted from the storage device 300 or the HDD 110, and a function of generating video data based on the input image data and outputting the generated video data to the display device 400.

The instruction module 151 issues various operation instructions to the storage device 300 and the display device 400 connected to the network 200, through the UPnP API 161. First, the instruction module 151 recognizes presence of devices connected to the network 200 and types of the devices by using a protocol called UPnP SSDP (Simple Service Discovery Protocol).

Further, the instruction module 151 acquires XML (Extensible Markup Language) files called device description and service description as defined by UPnP from the devices connected to the network 200 to thereby recognize details of service operating in each of the devices. Here, the details of service operating in each device are information, for example, about formats of images and video allowed to be played back by the display device 400.

In addition, the instruction module 151 can acquire information about image data opened on the network 200 by the storage device 300 based on UPnP CDS by sending a Browse action request of UPnP CDS through the UPnP API 161. That is, the instruction module 151 sends a Browse action request, and receives a Browse action response to the request through the UPnP API 161 so that the instruction module 151 can acquire information about image data contained in the Browse action response and including title names, URI's, of the image data stored in the storage device 300.

After receiving the Browse action response, the instruction module 151 designates the URI of each of the image data contained in the Browse action response and stored in the storage device 300, and sends an HTTP GET request as a data request for acquiring the image data etc. Successively, the instruction module 151 receives an HTTP response which is a response to the HTTP GET request and which contains the image data with the designated URI, so that the instruction module 151 acquires the image data stored in the storage device 300. Transmission/reception of the HTTP GET request and the HTTP response is performed through the HTTP server API 162. The instruction module 151 instructs a selection screen generator 153 to generate an image selection screen based on the acquired image data.

In addition, when an instruction to generate video and URI information of selected images are supplied to the instruction module 151 from the image selector 152, the instruction module 151 instructs the video generation engine 180 to send a URI-designated data request for the selected images to the storage device 300, and instructs the video generation engine 180 to generate video.

Or when an instruction to play back the selected images and URI information of the selected images are supplied to the instruction module 151 from the image selector 152, the instruction module 151 instructs the display device 400 to send a URI-designated data request for the selected images to the storage device 300 and play back the selected images, while the instruction module 151 does not instruct the video generation engine 180 to send a data request and generate video.

In addition, the instruction module 151 acquires URI information of video data generated by the video generation engine 180. The instruction module 151 instructs the display device 400 to send a URI-designated data request for the video data, and instructs the display device 400 to play back the video data.

The image selector 152 has a function of generating an image selection screen for selecting images and outputting the image selection screen from the GPU 104, and a function of selecting images in accordance with an operation input on the image selection screen.

The image selector 152 includes the selection screen generator 153. The selection screen generator 153 generates an image selection screen including images when the selection screen generator 153 receives an instruction from the instruction module 151 to generate the image selection screen based on acquired image data.

The image selector 152 receives an operation input on the image selection screen from the pointing device 117 or the keyboard 116 through the EC/KBC 115, and selects images based on the operation input. In addition, the image selector 152 outputs URI information of each selected image and a video generation instruction to the instruction module 151 when the image selector 152 receives the operation input on a video playback button of the image selection screen through the EC/KBC 115.

In addition, the image selector 152 may select image data satisfying selection conditions from a plurality of image data stored in the storage device 300 or the HDD 110 by referring to an index information database 110A.

In addition, upon reception of an operation input for playing back still images as selected images from the EC/KBC 115, the image selector 152 outputs an instruction and URI information about each of the selected images to the instruction module 151 to play back the selected images.

The video generation engine 180 includes an indexing processor 181 and a video generator 182, by which the video generation engine 180 can generate video based on image data and open the generated video to respective devices on the network 200 based on UPnP CDS.

The indexing processor 181 executes an indexing process for generating an index information database 110A. In the indexing process, for example, a face detection process is executed for detecting one or more face images from the image data. When face images are included in an image here, the face images are detected by the face detection process.

Each face image can be detected, for example, by analyzing features of image data and retrieving regions having features resembling to a prepared face image feature sample. The position (coordinates) and size of each face image contained in an image are detected by the face detection process. In this manner, the indexing processor 181 serves as a face image detector for detecting positions and sizes of face images contained in an image.

In addition, the indexing processor 181 detects characters by retrieving regions having features resembling to a prepared character feature sample from image data. For example, the characters in the image are signboard characters.

Further, the indexing processor 181 classifies a plurality of image data stored in the storage device 300 or the HDD 110 into groups, for example, based on shooting date and time, and generates information for identifying each of the groups. Here, when, for example, the period between two image data which were shot continuously in terms of shooting date and time has been beyond a predetermined period of time, the indexing processor 181 delimits a border between the two image data to classify the two image data into groups.

The indexing processor 181 outputs index information to the HDD 110, and stores the index information in the index information database 110A. The index information includes information about face images, character information, group information, obtained by the indexing process.

The video generator 182 generates video data based on input image data. For example, the video generator 182 generates video added with a focus effect on persons' faces detected by the indexing process, from input image data. That is, the video generator 182 can generate video composed of a plurality of frames including images different from the image, based on the input image data. Incidentally, the generated video data will be described later with reference to FIG. 7, FIGS. 8A to 8C, FIGS. 9A to 9C, FIGS. 10A and 10B and FIGS. 11A to 11E.

In addition, when a plurality of image data are inputted to the video generator 182, the video generator 182 can generate one video in such a manner that video based on respective image data is displayed in order based on index information of the respective image data. That is, for example, for generation of video based on a group of images equal in shooting date and time, video permitting a user to recognize the shooting place of the image group can be generated in such a manner that video based on a landscape image data containing no person therein is displayed ahead of video based on any other image data, or video permitting a user to recognize persons in the image group and purposes of the image group can be generated in such a manner that video based on an image data containing the largest number of persons is displayed ahead of video based on any another image data. Alternatively, video permitting a user to recognize the shooting place of the image group may be generated in such a manner that video based on an image containing characters of a signboard or the like in a tourist resort is displayed ahead of video based on any other image.

Figure 4:
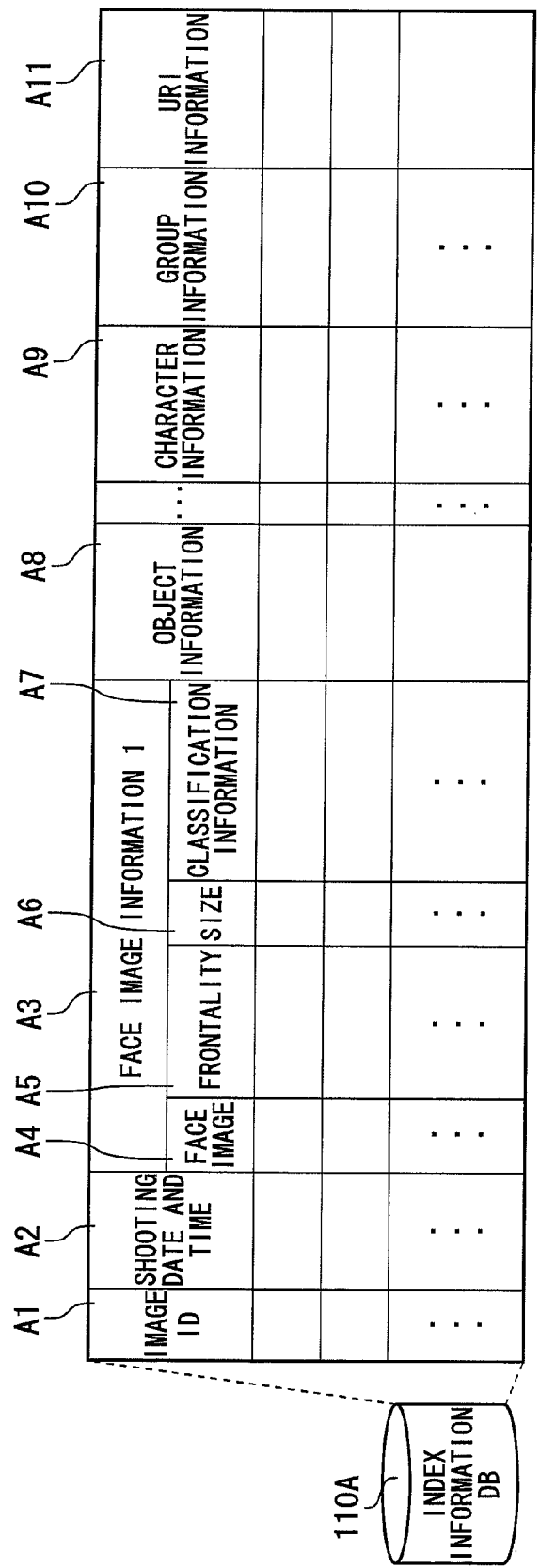
FIG. 4 is a view showing a configuration example of an index information database according to the embodiment of the invention.

The index information database 110A generated by the indexing processor 181 will be described next with reference to FIG. 4. FIG. 4 is a view showing an example of a configuration of the index information database 110A. For example, information including image ID A1, shooting date and time A2, face image information A3, face image A4, frontality A5, size A6, classification information A7, object information A8, character information A9, group information A10, URI information A11, etc. is stored in the index information database.

Here, the image ID A1 is identification information assigned to each image data. The shooting date and time A2 is time information indicating the shooting date and time of each still image. The face image information A3 is information generated when at least one person is contained in still image data. When a plurality of persons are contained in the image data, pieces of face image information A3 corresponding to the plurality of persons are generated.

The face image A4, the frontality A5, the size A6, the classification information A7, etc. are stored as the face image information A3 in the index information database 110A. Here, the face image A4 is a face image extracted from image data by the indexing processor 181. The frontality A5 is the frontality of each face image. The size A6 is the size of each face image. The classification information A7 is information for classifying images estimated to be of the same person. The indexing processor 181 generates the classification information A7 by classifying face images extracted from image data.

The object information A8 is information about a specific subject, which information is generated when the specific subject is contained in the image data. For example, the specific subject may be a building, a famous monument, a plant, an animal, a mountain, an automobile, etc. The specific subject is however not limited thereto but may be anything.

The character information A9 is information about some character, which information is generated when the character is contained in the image data.

The group information A10 is information for identifying each of groups into which a plurality of image data stored in the storage device 300 or the HDD 110 are classified, e.g. based on shooting date and time.

The URI information A11 is information indicating URI of each image data when the image data is stored in the storage device 300 or the like.

That is, the computer 100 can determine whether each image data contains a face image or not, whose face image it is, whether there is any character contained in each image data or not, which group each image data belongs to, etc., based on the index information database 110A. Therefore, the computer 100 can detect an image data etc. containing a desired person or character from one or more image data stored in the storage device 300 or the HDD 110 by using the index information database 110A.

Figure 5:
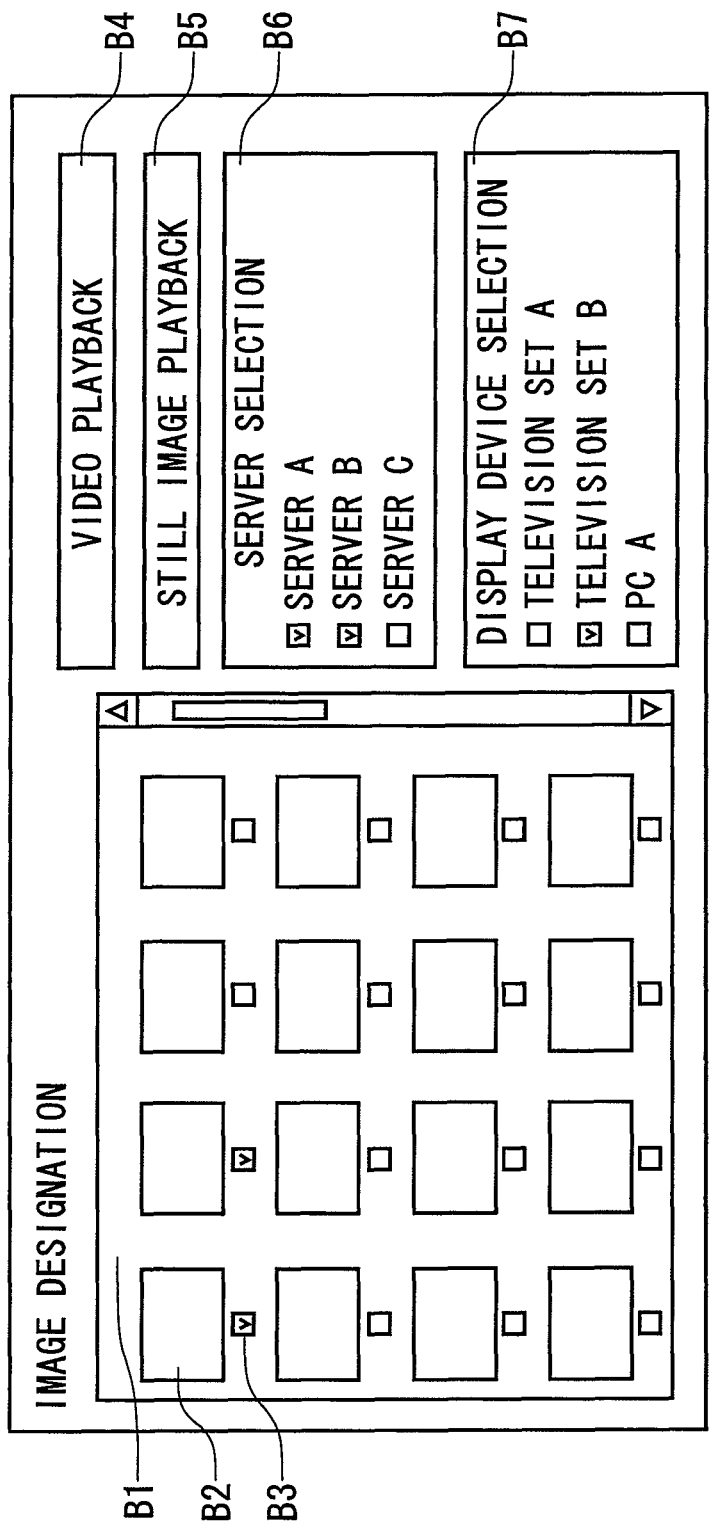
FIG. 5 is a view showing an example of an image selection screen according to the embodiment of the invention.

Successively, an image selection screen generated by the selection screen generator 153 will be described with reference to FIG. 5. FIG. 5 is a view showing an example of the image selection screen.

Here, an image list region B1, image regions B2, image selection boxes B3, a video playback button B4, a still image playback button B5, a server selection field B6, a display device selection field B7, etc. are displayed on the image selection screen.

Here, the image list region B1 is a region for displaying acquired images. A list of image data acquired from servers selected in the server selection box B6 is displayed in the image list region B1. Incidentally, the servers are servers such as the storage device 300, which are connected to the network 200.

Each image region B2 is a region for displaying an image acquired from the storage device 300. Not only an image but also the title etc. of the image may be displayed in the image region B2. The image selection boxes B3 are provided for accepting user's operation for selecting one or more images, so that one image selection box B3 is provided for each image.

The video playback button B4 is a button for playing back video based on images selected by a user. Upon acceptance of an operation input on the button B4, the computer 100 performs the aforementioned video generation process after the screen is changed to a user's preference designation screen which will be described later with reference to FIG. 7, and instructs the display device 400 to send a data request for video generated by the video generation process and play back the video. Incidentally, the video playback button B4 is displayed in the case where a plurality of image data are selected on the image selection screen, but need not be displayed in the case where only one single image data is selected on the image selection screen.

On the other hand, the still image playback button B5 is a button for playing back images selected by a user without execution of the video generation process. Upon reception of an operation input on the still image playback button B5, the computer 100 instructs the display device 400 to send a URI-designated data request for selected images and play back the selected images, so that the display device 400 displays the selected images, e.g. in order of title name or generation date and time.

The server selection field B6 is a selection field for selecting at least one server whose image data are displayed in the image list region B1. Device names etc. acquired based on device description or service description of UPnP for identifying servers, and selection buttons for selecting the servers are disposed in the server selection field B6. Incidentally, the HDD 110 which is a storage device of the computer 100 may be displayed as a choice in the server selection field B6.

The display device selection field B7 is a selection field for playing back/displaying video or still images. Device names etc. acquired based on device description or service description of UPnP for identifying display devices, and selection buttons for selecting the servers are disposed in the display device selection field B7. The LCD 105 which is a display device of the computer 100 may be displayed as a choice in the display device selection field B7.

Not only image data of each server selected in the server selection field B6 but also image data selected by a user may be displayed in the image list region B1. That is, even when selection of a server A is cancelled after a user selects the server A and images of the server A, the image data selected by the user may be, for example, displayed in the image list region B1. In addition, the order of displaying images in the image list region B1 may be, for example, the display order of preferential arrangement of image data selected by the user.

Successively, an example of the image selection screen will be described with reference to FIG. 6. Incidentally, the image selection screen shown in FIG. 6 is a screen which is generated by the selection image generator 153 based on the index information database 110A and which is provided for selecting each image data satisfying predetermined selection conditions from a plurality of image data stored in the storage device 300 or the HDD 110.

Figure 6:
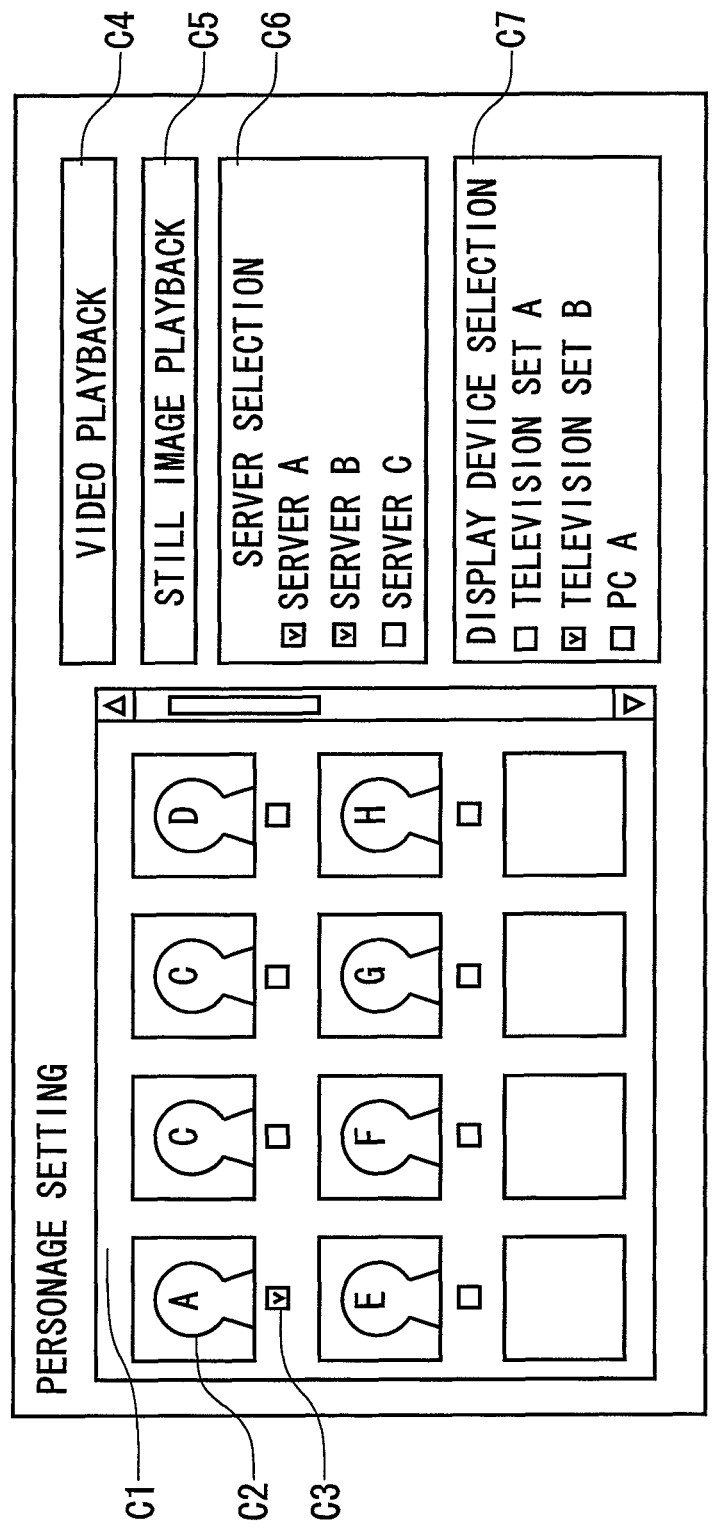
FIG. 6 is a view showing another example of the image selection screen according to the embodiment of the invention.

A face image list region C1, face image regions C2, selection buttons C3, a video playback button C4, a still image playback button C5, a server selection field C6, a display device selection field C7, etc. are displayed on the image selection screen shown in FIG. 6.

The face image list region C1 is a region where persons' face images are disposed one by one as choices. In addition, each face image region C2 is a region for displaying a face image. Each selection button C3 for designating a corresponding face image is disposed nearby the region C2.

Here, when the image selector 152 accepts an operation input on a selection button C3 so that a face image is designated, the image selector 152 can select all image data containing the person of the designated face image, based on the index information database 110A. Incidentally, the selected image data may be all image data containing the person of the designated face image, in image data stored in servers selected in the server selection field C6.

The video playback button C4, the still image playback button C5, the server selection field C6 and the display device selection field C7 have functions corresponding to the video playback button B4, the still image playback button B5, the server selection field B6 and the display device selection field B7 in FIG. 5, respectively.

Figure 7:
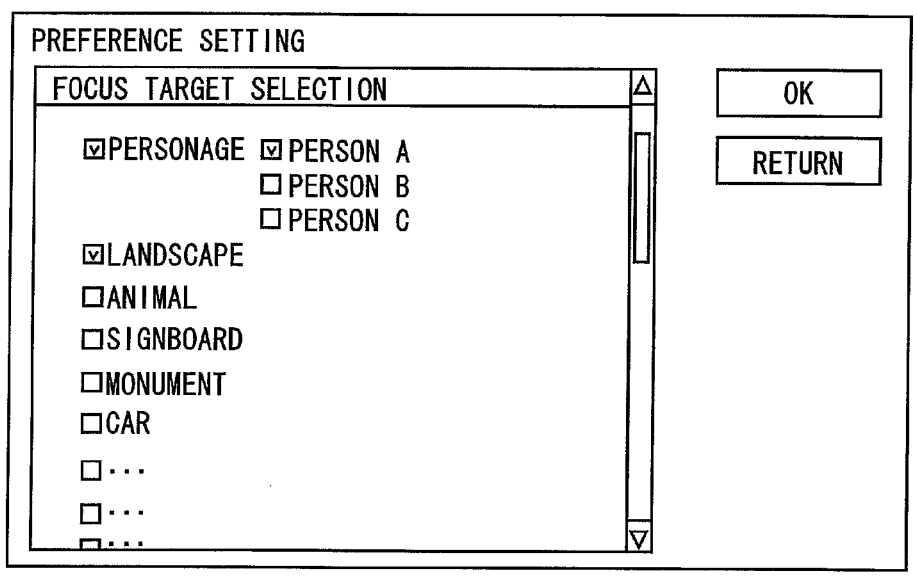
FIG. 7 is a view showing an example of a user's preference designation screen according to the embodiment of the invention.

Successively, an example of a user's preference designation screen will be described with reference to FIG. 7.

Choices for designating/deciding subjects on which generated video is focused are displayed on the user's preference designation screen when the video generation engine 180 generates the video based on image data. For example, personage, landscape, animal, signboard, monument, automobile, etc. are displayed as choices on the screen shown in FIG. 7. As for the personage, choices for designating persons to be focused on are displayed.

Incidentally, on the user's preference designation screen, choices for subjects not contained in image data selected on the aforementioned image selection screen may be selectively provided as additional choices or as non-display choices. Moreover, the user's preference designation screen may be provided so that effects, etc. used in video generated by the video generation engine 180 can be designated.

When acceptance of an operation input on the user's preference designation screen is completed and an operation on an OK button is accepted, the computer 100 performs the aforementioned video generation process and instructs the display device 400 to send a data request for video generated by the video generation process and play back the video. Incidentally, in the video generation process, video may be generated based on a user's operation input on the user's preference designation screen or video may be generated without acceptance of any user's operation input on the user's preference designation screen. In this case, for example, video etc. equally focused on personage, landscape, etc. is generated.

Figure 8A:
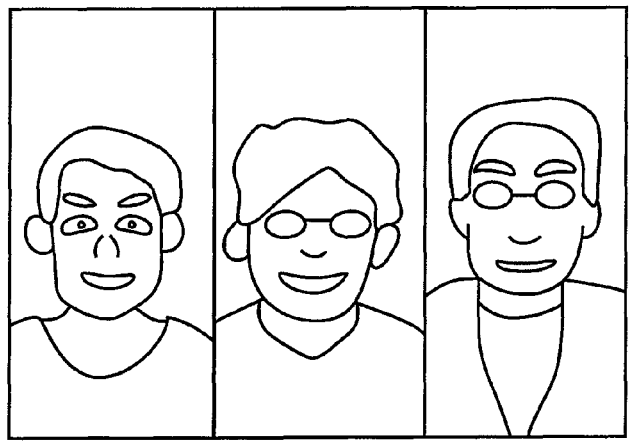
FIGS. 8A to 8C are views showing a video example generated by a video generation engine according to the embodiment of the invention.
Figure 8B:
Figure 8C:
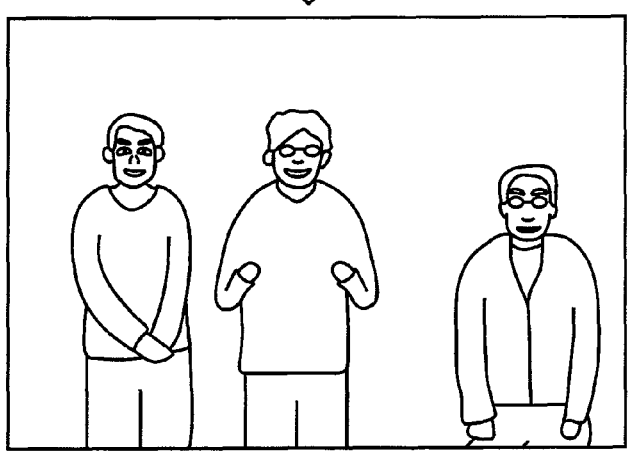

Next, video generated by the video generation engine 180 according to the embodiment will be described with reference to FIGS. 8A to 8C, FIGS. 9A to 9C, FIGS. 10A and 10B, FIGS. 11A to 11E and FIGS. 12A to 12C. FIGS. 8A to 8C show an example of video generated by the video generation engine 180.

Video shown in FIGS. 8A to 8C is displayed as follows. First, as shown in FIG. 8A, video is displayed in a state where a plurality of face images are disposed so as to be distributed to a plurality of display areas. Incidentally, the plurality of face images are based on face images extracted from original image data. With the passage of time, the size of an image displayed in each display area changes gradually to be close to the size of the original image data. Finally, as shown in FIG. 8C, all images are displayed on the whole of a display screen composed of the plurality of display areas. The state shown in FIG. 8C continues for a predetermined time. That is, the user can watch the video as if the video were still for the predetermined time.

Figure 9A:
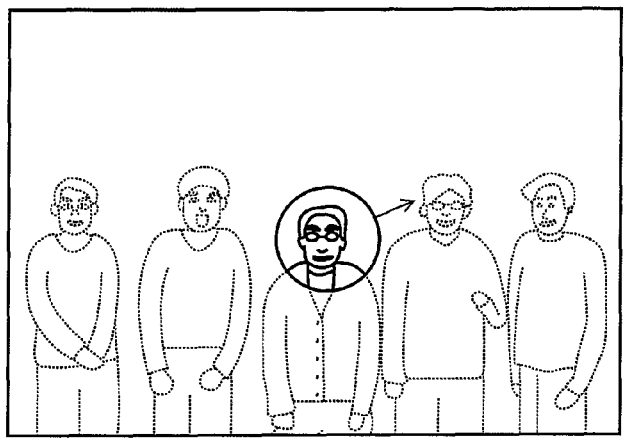
FIGS. 9A to 9C are views showing a video example generated by the video generation engine according to the embodiment of the invention.
Figure 9B:
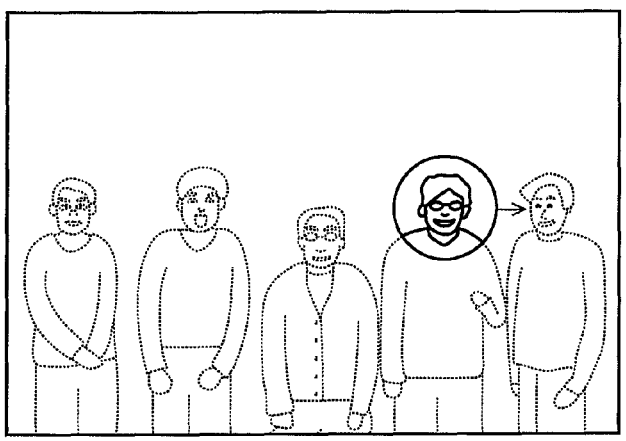
Figure 9C:
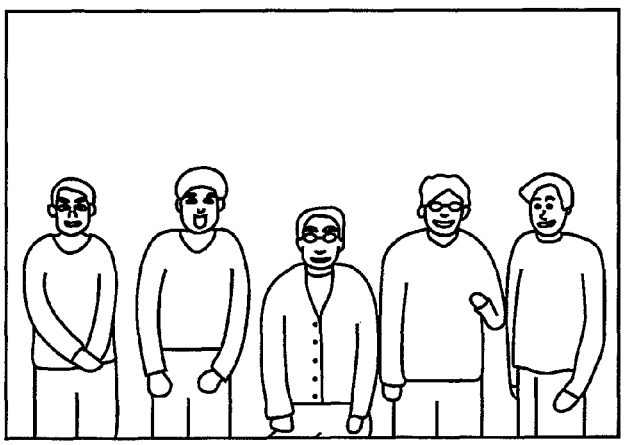

Video shown in FIGS. 9A to 9C is displayed in a state where the whole of the still image is blurred. As shown in FIG. 9A, a frame with which part of the still image is covered is displayed on the still image while a region encircled by the frame is displayed so as to be highlighted. On this occasion, a non-highlighted region (region out of the frame) is displayed in a state where the region has been reduced in brightness or the region is blurred. When this frame is moved in order on face images contained in the still image as shown in FIG. 9B, the face images of the still image are displayed so as to be highlighted one by one successively. When, for example, all the face images of the still image are displayed, the whole image as shown in FIG. 9C is displayed so as to be still for a predetermined time.

Figure 10A:
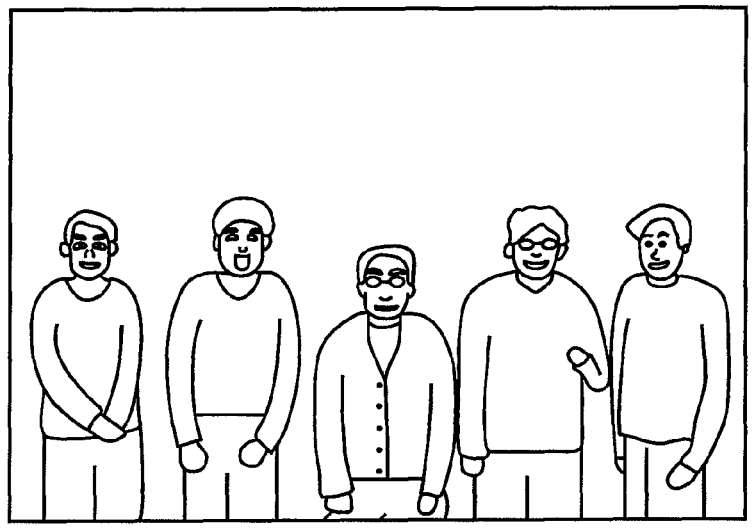
FIGS. 10A and 10B are views showing a video example generated by the video generation engine according to the embodiment of the invention.
Figure 10A:
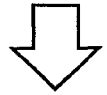
Figure 10A:
Figure 10B:
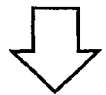
Figure 10B:
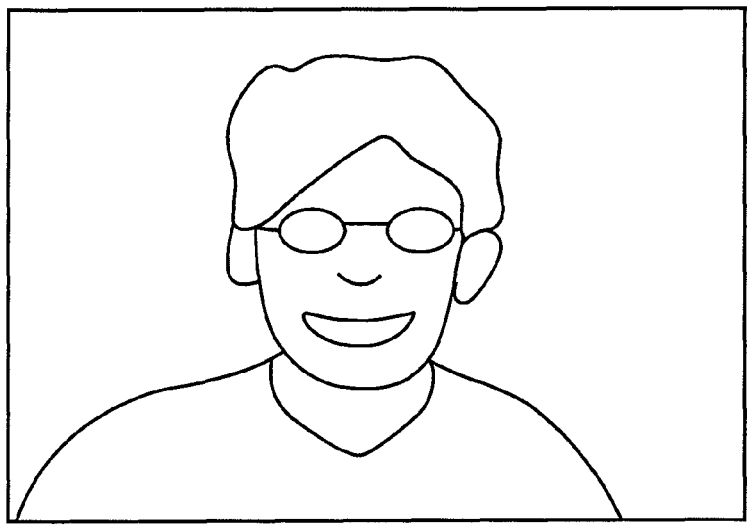
Figure 10B:
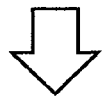
Figure 10B:

In video shown in FIGS. 10A and 10B, face images are displayed while enlarged one by one in accordance with persons. In the video, the whole image is displayed so as to be still on the screen as represented by the image as shown in FIG. 10A. A plurality of face images contained in the image are displayed while enlarged one by one successively. In the video, for example, face images as shown in FIG. 10B are displayed while enlarged successively in leftward order so that enlarging display starts at the right person in the photograph. Incidentally, in FIG. 10B, the face of the second person from the right is enlarged.

Figure 11A:
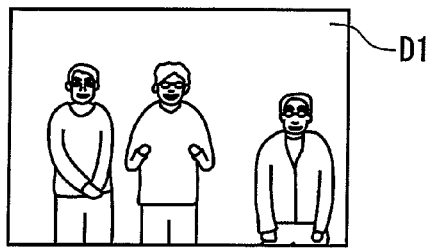
FIGS. 11A to 11E are views showing a video example generated by the video generation engine according to the embodiment of the invention.
Figure 11B:
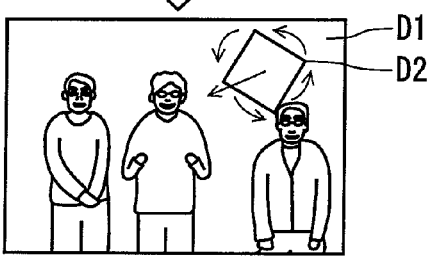
Figure 11C:
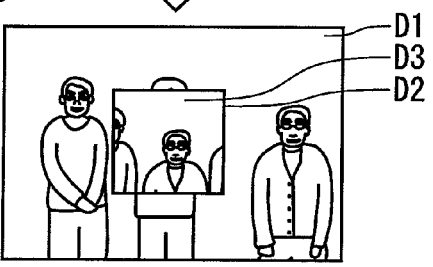
Figure 11D:
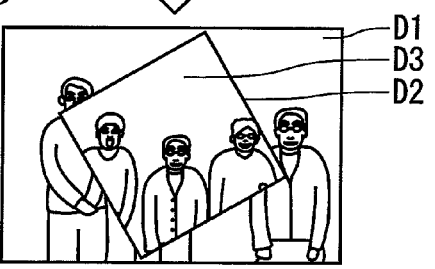
Figure 11E:
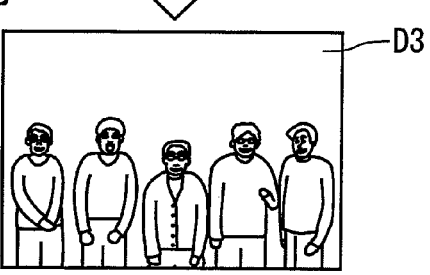

In video shown in FIGS. 11A to 11E, a displayed image is changed to a next image. First, as shown in FIG. 11A, an image D1 is displayed so as to be still for a predetermined time. Successively, as shown in FIG. 11B, a figure D2 which is a graphics image for covering part of the image D1 is moved while rotated, for example, toward the center or the like of the image D1. When the figure D2 has reached the center, a next image D3 different from the image D1 is displayed in a region coincident with the region of the figure D2, as shown in FIG. 11C. Successively, as shown in FIG. 11D, for example, the figure D2 is enlarged while rotated, so that the region of the image D3 displayed in the figure D2 is also enlarged. When the figure D2 is enlarged further, the image D3 is displayed completely as shown in FIG. 11E.

Figure 12A:
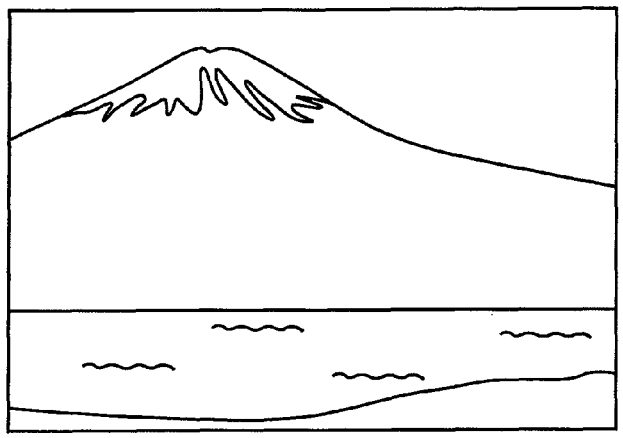
FIGS. 12A to 12C are views showing a video example generated by the video generation engine according to the embodiment of the invention.
Figure 12B:
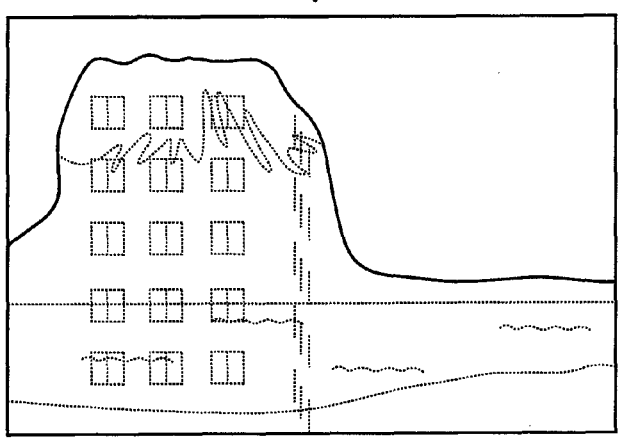
Figure 12C:
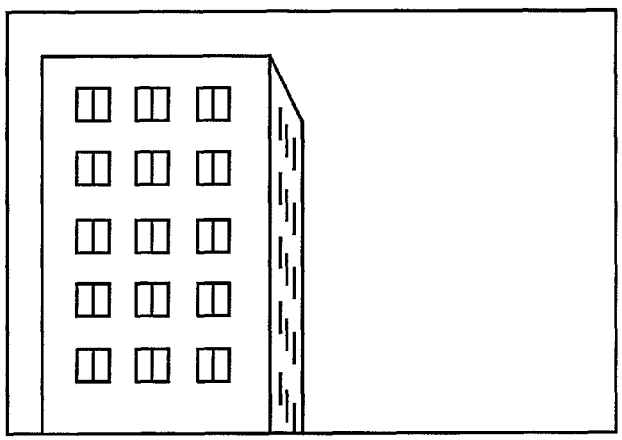

In video shown in FIGS. 12A to 12C, an image shown in FIG. 12A is changed to a next image shown in FIG. 12B. That is, a mountain image shown in FIG. 12A is changed to a building image shown in FIG. 12C via an image shown in FIG. 12B like so-called morphing video. The video generation engine 180 generates video by interpolating an image between the images to be changed/transformed based on image data of FIGS. 12A and 12C.

Although the indexing processor 181 detects face images, their positions and sizes, etc. from each image so that the video generator 182 can generate video focused on the detected faces as shown in FIGS. 8A to 8C, FIGS. 9A to 9C or FIGS. 10A and 10B, the video generator 182 may generate video focused on a signboard character, an object of a tourist resort, a mountain, an automobile, an animal, etc. besides the face images, for example, in accordance with a result of indexing of each target by the indexing processor 181, or may generate video with effects suitable for subjects to be focused on and different according to the subjects.

An example of a configuration of video data generated by the video generation engine 180 will be described next with reference to FIG. 13. Video data V1 is composed of respective scenes based on images 1 to N. Each of the scenes of the images is composed of a still image scene which is a scene where a still image is displayed, and an effect scene which is a scene where an image moves based on the still image.

Figure 13:
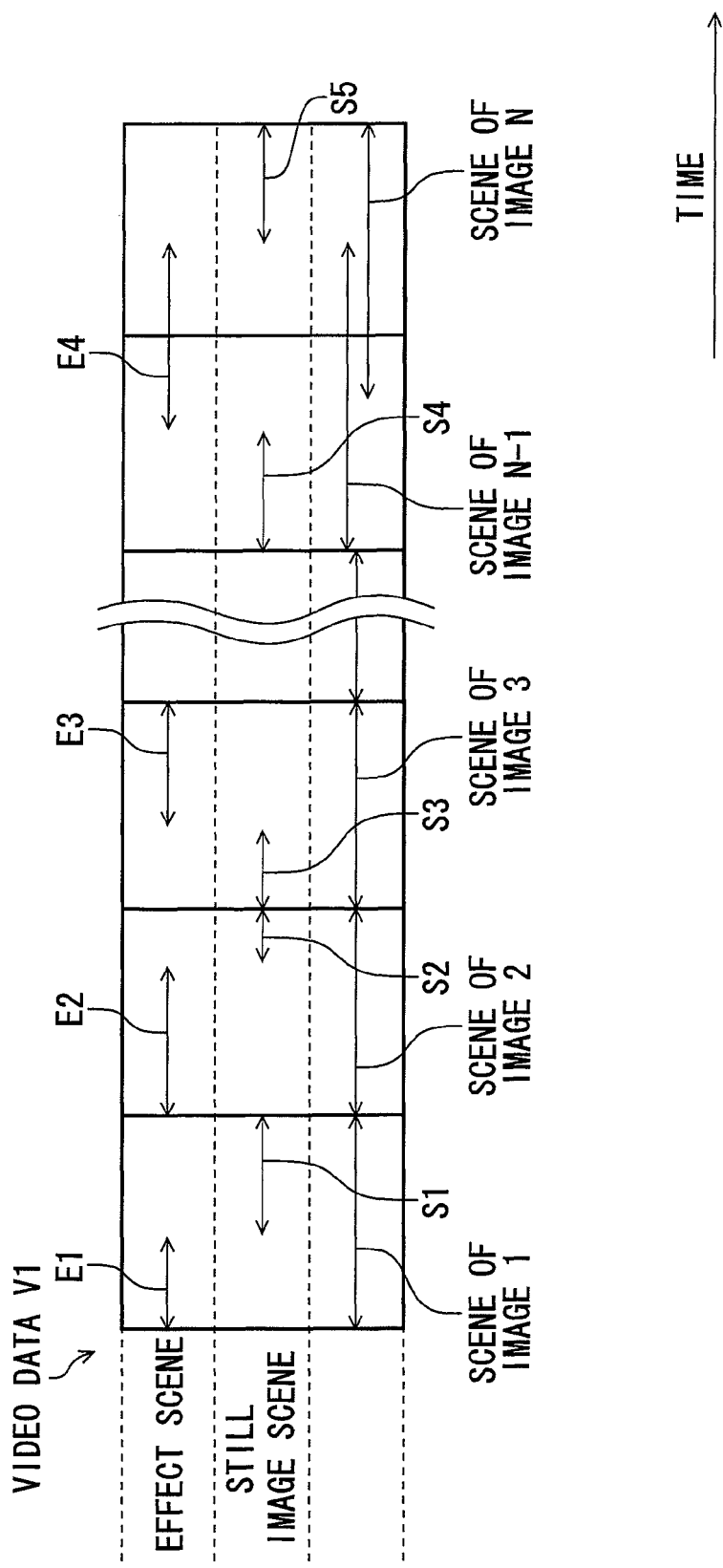
FIG. 13 is a view showing a configuration example of video generated by the video generation engine according to the embodiment of the invention.

In each of the scenes of images 1 and 2 in FIG. 13, an effect scene is displayed in a first half of the scene while a still image scene is displayed in a second half of the scene. That is, video shown in FIGS. 8A to 8C or FIGS. 9A to 9C is displayed in these scenes. In a scene of image 3, a still image scene is displayed in a first half of the scene while an effect scene is displayed in a second half of the scene. That is, in a scene of image 3, for example, video shown in FIGS. 10A and 10B is displayed based on the image 3.

In a scene of image N−1, a still image scene S4 is displayed in a first half of the scene while an effect scene E4 is displayed in a second half of the scene. The effect scene E4 is an effect for switching one of two different images over to the other, for example, as shown in FIGS. 11A to 11E and FIGS. 12A to 12C. Part of a next image N is displayed in the midway of the effect scene E4. In a scene of image N, when the effect scene E4 is terminated, a still image scene S5 is displayed.

Incidentally, any effect may be applied to each of image scenes in the video data V1. The sequence of respective image scenes constituting the video data V1 may be based on index information of the respective images. For example, a scene of a landscape image containing no person therein or a scene of an image containing the largest number of persons therein may be displayed in the head of the video data V1.

Figure 14:
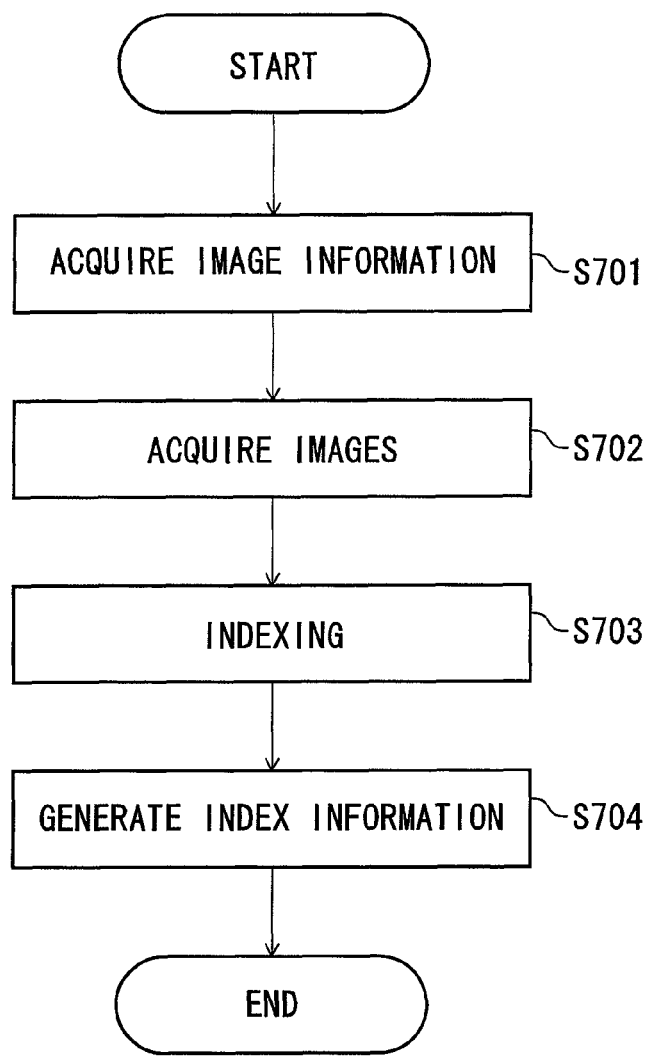
FIG. 14 is a chart showing an example of a processing flow of an indexing process according to the embodiment of the invention.

Next, a processing sequence as to generation of an index information database will be described with reference to FIG. 14. FIG. 14 is a flow chart showing an example of a processing flow in the indexing process performed by the indexing processor 181.

First, the media control program 150 acquires image information from the storage device 300 due to a Browse action of CDS (S701). Incidentally, the instruction module 151 acquires image information from devices connected through the network 200 periodically, e.g. every day.

When the instruction module 151 acquires URI's of image data contained in the image information, the instruction module 151 sends a URI-designated data request (S702). Incidentally, when the instruction module 151 issues an image data request to URI's, the instruction module 151 may not issue the image data request to the URI's of image data which have been indexed by the indexing processor 181 prior to the request. That is, the instruction module 151 can refer to/compare the acquired URI's and URI information of the index information database 110A, so that the instruction module 151 can designate ones of the acquired URI's not contained in the index information data 110A and send a data request to the designated URI's.

Upon reception of image data in response to the data request, the video generation engine 180 performs an indexing process on the image data (S703), and writes information obtained from the indexing process into the index information database 110A (S704).

Figure 15:
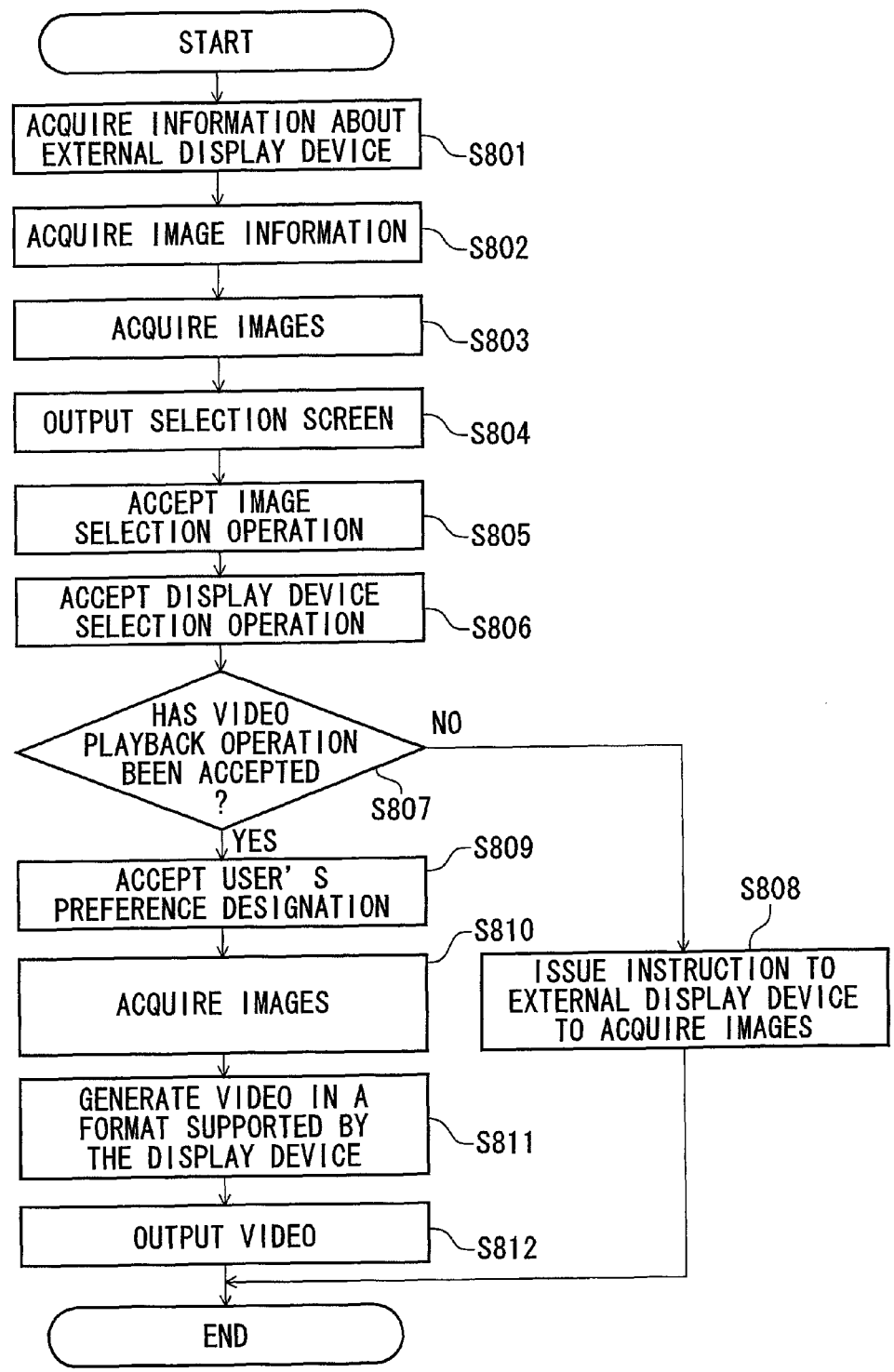
FIG. 15 is a chart showing an example of a processing flow of a video generation process performed by the computer according to the embodiment of the invention.

Successively, an example of a processing flow as to generation of video by the video generation engine 180 will be described with reference to FIG. 15.

First, when the instruction module 151 sends a service information request based on device description or service description of UPnP and receives a response to the request from the display device 400, the instruction module 151 acquires information about the display device 400 (S801). The information about the display device 400 includes information about image formats supported by the display device 400.

Successively, when the instruction module 151 sends a Browse action request of UPnP CDS and receives a Browse action response to the Browse action request from the storage device 300, the instruction module 151 acquires file names, URI information, etc. of image data stored in the storage device 300 (S802).

The instruction module 151 sends a URI-designated data request for a plurality of image data based on the URI information of the image data acquired in the step S802 and receives the image data from the storage device 300 (S803). When URI's are assigned to the image data stored in the storage device 300, respectively, and a plurality of image data are acquired, the instruction module 151 sends a request with designated URI's assigned to the plurality of image data respectively.

Next, the selection screen generator 153 generates an image selection screen based on the plurality of received image data and outputs the generated image selection screen from the GPU 104 (S804). Incidentally, the screen outputted from the GPU 104 may be either of the screens shown in FIGS. 5 and 6.

In addition, when the plurality of image data are stored in the index information database 110A in the case where the image selection screen shown in FIG. 6 is generated, the selection image generator 153 may generate the image selection screen without acquiring the plurality of image data from the storage device 300 but by using the plurality of image data in the database.

Successively, the image selector 152 selects images based on a selection operation input on the image selection screen (S805). In addition, the image selector 152 selects a display device for playing back/displaying images or video, based on an operation input on the image selection screen (S806).

Then, upon reception of an operation input for playing back still images on the image selection screen (No in S807), the image selector 152 outputs an instruction and URI information of the selected images to the instruction module 151 to play back selected images, and the instruction module 151 sends an instruction to the display device 400 to send a URI-designated data request for the selected images selected by the image selector 152 to the storage device 300, acquire the selected images from the storage device 300 and play back the thus acquired selected images (S808). The computer 100 may not generate video upon reception of an operation input for playing back still images.

On the other hand, upon reception of an operation input for playing back video in S807 (Yes in S807), the selection screen generator 153 generates a user's preference designation screen and outputs the generated screen from the GPU 104, and the computer 100 accepts an operation input on the screen (S809). Then, the image selector 152 outputs a video generation instruction and URI information of the plurality of image data subjected to the selection operation from the instruction module 151 to the video generation engine 180, and issues an instruction to the video generation engine 180 to generate video based on an operation input on the user's preference designation screen. The instruction module 151 may issue an instruction to the video generation engine 180 to crate video in a predetermined image format.

For example, the predetermined image format may be MPEG-2 as a format which can be generally displayed by a DLNA DMR or a video format which can be displayed by the display device 400 and which is acquired in S801. When the video generation engine 180 sends a data request with designated input URI's, the video generation engine 180 receives a plurality of image data from the storage device 300 (S810). The video generation engine 180 may acquire a plurality of image data stored in the HDD 110.

The video generation engine 180 starts generation of video data based on the plurality of acquired image data (S811), and opens availability of the video data to the network 200. The video data generated here may be video in an image format designated by the instruction module 151. Upon reception of a URI-designated data request for the video data from the display device 400, the video generation engine 180 outputs the video data to the display device 400 (S812). When the computer 100 accepts a selection operation for selecting the LCD 105 of the computer 100 as a display device in S806, the video generation engine 180 outputs the generated video to the GPU 104 in 5812.

Figure 16:
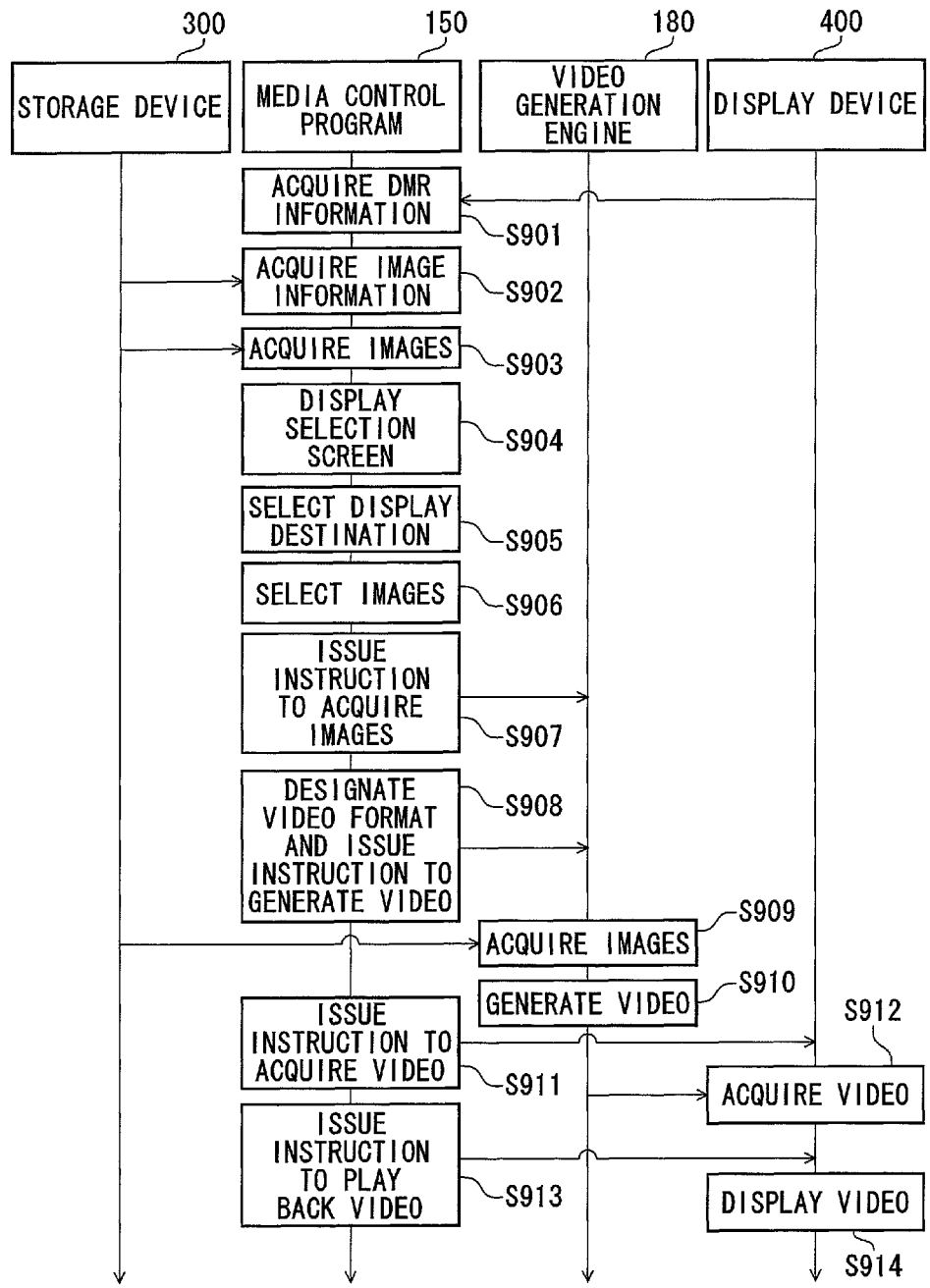
FIG. 16 is a chart showing an example of a processing sequence of the video generation process according to the embodiment of the invention.

A processing sequence of the storage device 300, the media control program 150, the video generation engine 180 and the display device 400 will be described next with reference to FIG. 16. FIG. 16 is a view showing an example of a processing flow performed by the media control program 150, the video generation engine 180, the storage device 300 and the display device 400.

Firstly, the media control program 150 acquires information about the display device 400 due to a service information request using device description or service description of UPnP (S901). Then, the media control program 150 receives information about image data from the storage device 300 due to a Browse action (S902). The media control program 150 sends a URI-designated image data request for a plurality of image data included in the information about image data, and receives the plurality of image data from the storage device 300 (S903).

Successively, the media control program 150 generates an image selection screen for selecting one or more images and outputs the image selection screen from the GPU 104 to the LCD 105 (S904). The media control program 150 selects a display device for displaying video, based on an operation input on one of buttons in a display device selection field displayed on the image selection screen (S905). Upon reception of an operation input on the image selection screen, the media control program 150 selects images (S906). In addition, the media control program 150 accepts an operation input on a user's preference designation screen.

The media control program 150 issues an instruction to the video generation engine 180 to send a URI-containing data request for the image data selected in S906 and generate video (S907). On this occasion, the media control program 150 issues an instruction to the video generation engine 180 to generate the video in a predetermined image format and generate the video based on a user's operation input on the user's preference designation screen (S908).

Upon reception of the data request instruction from the media control program 150, the video generation engine 180 acquires image data with the URI's included in the instruction from the storage device 300 (S909). A URI is assigned to each image data. When a plurality of image data are acquired, the video generation engine 180 acquires image data with URI's.

The video generation engine 180 starts generation of video having the configuration shown in FIG. 13 and including scenes shown in FIGS. 8A to 8C, FIGS. 9A to 9C, FIGS. 10A and 10B, FIGS. 11A to 11E or FIGS. 12A to 12C, based on the acquired image data (S910). On this occasion, a URI is assigned to video data generated by the video generation engine 180, and information about the video data including the URI is opened to each device on the network 200, for example, based on UPnP CDS etc.

Successively, the media control program 150 acquires the URI of the video data generated by the video generation engine 180 to thereby issue an instruction the display device 400 to send the URI-including data request and play back the acquired video data (S911).

Upon reception of the instruction to send the URI-including data request for the vide data from the media control program 150, the display device 400 acquires the video data from the URI contained in the instruction (S912). The media control program 150 issues an instruction to the display device 400 to display video (S913). The display device 400 decodes and displays the acquired video data (S914).

In the processing shown in FIG. 16, the media control program 150 and the video generation engine 180 may acquire image data stored in the HDD 110 and the video generation engine 180 may output generated video to the LCD 105 of the computer 100.

According to the embodiment, the computer 100 can generate video data based on image data stored in the storage device 300 or the HDD 110 connected to the network 200.

The computer 100 can output the generated video data to the display device 400 connected through the network 200 and issue an instruction to the display device 400 to play back the video data. In this manner, the computer 100 can display video favorite with a user on one device connected through the network, based on image data acquired from another device connected through the network.

The computer 100 performs the indexing process for face detection on the acquired image data and generates video data based on information acquired by the indexing process. The computer 100 stores the index information in accordance with each image data and selects image data, e.g. in accordance with persons, based on the index information. In this manner, the computer 100 can generate/output video data favorite with the user.

The computer 100 may acquire information as to an image format which can be played back by the display device 400 from the display device 400, so that the computer 100 can generate/output video data in the image format which can be played back by the display device 400. Alternatively, the computer 100 may generate video data in an image format which is generally used based on DLNA so that the computer 100 can output the video data in the image format which can be played back by the display device 400.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An image processing device comprising:
   an acquisition module configured to acquire a plurality of still images from a plurality of servers through a network;
   an image selection screen generator configured to generate an image selection screen for receiving an image selection operation, wherein the image selection screen includes:
     a server selection field in which the servers are listed along with respective check boxes so that each of the servers is individually selectable as an image acquisition source,
     an image list region in which the still images acquired from the selected servers are collectively displayed along with respective check boxes so that each of the acquired still images is individually selectable as a video generation target, and
     a display device selection field in which one or more available display devices are listed along with respective check boxes so that each of the display devices is individually selectable as an image output destination;
   a generator configured to generate video data based on the selected still image, wherein the video data comprises a first scene comprising the selected still image and a second scene comprising a moving image which is generated from the selected still image;
   a first transmission module configured to transmit an existing location of the generated video data through the network to a selected display device to allow the selected display device to play back the video data referring to the existing location of the generated video data; and
   a second transmission module configured to transmit the video data to the selected display device through the network in response to a request from the selected display device.

2. The device of claim 1, wherein:
   in the video data, the first scene and the second scene are simultaneously displayed such that the second scene moves superimposed on the first scene,
   the second scene is generated from a portion of the selected still image,
   the first scene is generated from the remaining portion of the selected still image, and
   a boundary between the first scene and the second scene is defined as a rotating rectangle.

3. The device of claim 1, further comprising:
   an indexing module configured to generate index information about the images, wherein a sequence of scenes in the video data is related to the index information.

4. The device of claim 1, wherein the generator is configured to generate the video to display landscape image data containing no person therein ahead of video based on any other image data.

5. The device of claim 1,
   wherein the first transmission module is configured to transmit an instruction to play back the selected still image to the selected display device through the network, and
   wherein the generator is configured to inhibit generating the video data while the first transmission module transmits the instruction to the selected display device to play back the selected at least one image.

6. The device of claim 5, further comprising:
   an output module configured to output a screen comprising buttons for selecting either:
   generating the video data, or
   transmitting the instruction to play back the selected at least one image to the selected display device.

7. The device of claim 1, wherein the generator is configured to generate the video data in an image format displayable on the selected display device.

8. The device of claim 7,
   wherein the acquisition module is configured to acquire information about the image format through the network, and
   wherein the generator is configured to generate the video data in the image format.

9. The device of claim 1, further comprising:
   an opening module configured to release the video data through the network.

10. The device of claim 1, further comprising:
    an indexing module configured to generate index information about the acquired still images; and
    a selector configured to select certain still images from the acquired still images based on the index information.

11. The device of claim 10, wherein the certain still images selected by the selector are displayed on the image selection screen.

12. The device of claim 1, wherein the image selection screen comprises:
    a first region for receiving a server selection operation; and
    a second region for displaying certain still images which are extracted in accordance with the server selection operation.

13. The device of claim 1, wherein the generator is configured to generate the video to display image data containing the largest number of persons ahead of video based on any other image data.

14. The device of claim 1, wherein the generator is configured to generate the video to display image data containing characters of a signboard ahead of video based on any other image data.

15. An image processing method in an image processing device comprising a first display device, comprising:

acquiring a plurality of still images from a plurality of servers through a network;

generating an image selection screen for receiving an image selection operation, wherein the image selection screen includes:

a server selection field in which the servers are listed along with respective check boxes so that each of the servers is individually selectable as an image acquisition source, an image list region in which the still images acquired from the selected servers are collectively displayed along with respective check boxes so that each of the acquired still images is individually selectable as a video generation target, and a display device selection field in which one or more available display devices are listed along with respective check boxes so that each of the display devices is individually selectable as an image output destination;

generating video data based on the selected still image, wherein the video data comprises a first scene comprising the selected still image and a second scene comprising a moving image which is generated from the selected still image; and executing the following steps:

outputting the video data to the first display device; and transmitting the video data to a selected second display device through the network in response to a request from the selected second display device after transmitting an existing location of the generated video data to play back the video data to the selected second display device.

16. The device of claim 15, wherein:

in the video data, the first scene and the second scene are simultaneously displayed such that the second scene moves superimposed on the first scene, the second scene is generated from a portion of the selected still image, the first scene is generated from the remaining portion of the selected still image, and a boundary between the first scene and the second scene is defined as a rotating rectangle.

17. An image processing device, comprising:

a first display device;

a memory; and one or more processors configured, in conjunction with the memory, to:

acquire a plurality of still images from a plurality of servers through a network;

generate an image selection screen for receiving an image selection operation, wherein the image selection screen includes:

a server selection field in which the servers are listed along with respective check boxes so that each of the servers is individually selectable as an image acquisition source, an image list region in which the still images acquired from the selected servers are collectively displayed along with respective check boxes so that each of the acquired still images is individually selectable as a video generation target, and a display device selection field in which one or more available display devices are listed along with respective check boxes so that each of the display devices is individually selectable as an image output destination;

generate video data based on the selected still image, wherein the video data comprises a first scene comprising the selected still image and a second scene comprising a moving image which is generated from the selected still image;

output the video data to the first display device; and transmit the video data to a selected second display device through the network in response to a request from the selected second display device after transmitting an existing location of the generated video data to play back the video data to the selected second display device.

18. The device of claim 1, wherein:

in the video data, the first scene and the second scene are simultaneously displayed such that the second scene moves superimposed on the first scene, the second scene is generated from a portion of the selected still image, the first scene is generated from the remaining portion of the selected still image, and a boundary between the first scene and the second scene is defined as a rotating rectangle.

* * * * *